(12) United States Patent
Yeddu et al.

(10) Patent No.: US 11,860,756 B2
(45) Date of Patent: Jan. 2, 2024

(54) AUTOMATED SYSTEM ALERT BASED ON LOGS SENTIMENT ANALYSIS

(71) Applicant: KYNDRYL, INC., New York, NY (US)

(72) Inventors: Dinesh Babu Yeddu, Guntur (IN); Sundaravelu Shanmugam, Bangalore (IN); Raju Karuppiah, Bangalore (IN)

(73) Assignee: KYNDRYL, INC., New York, NY (US)

( * ) Notice: Subject to any disclaimer, the term of this patent is extended or adjusted under 35 U.S.C. 154(b) by 272 days.

(21) Appl. No.: 17/492,040

(22) Filed: Oct. 1, 2021

(65) Prior Publication Data

US 2023/0103840 A1 Apr. 6, 2023

(51) Int. Cl.

| | | |
|---|---|---|
| G06F 11/00 | (2006.01) | |
| G06F 11/32 | (2006.01) | |
| G06F 11/34 | (2006.01) | |
| G06F 40/30 | (2020.01) | |
| G06F 40/237 | (2020.01) | |

(52) U.S. Cl.
CPC ........ G06F 11/327 (2013.01); G06F 11/3428 (2013.01); G06F 11/3476 (2013.01); G06F 40/237 (2020.01); G06F 40/30 (2020.01)

(58) Field of Classification Search
CPC .. G06F 11/327; G06F 11/3476; G06F 11/324; G06F 11/3072; G06F 11/3086; G06F 11/0769; G06F 11/0775; G06F 40/30; G06F 40/205; G06F 40/284
See application file for complete search history.

(56) References Cited

U.S. PATENT DOCUMENTS

| | | |
|---|---|---|
| 8,495,429 B2 | 7/2013 | Fu et al. |
| 10,817,604 B1 | 10/2020 | Kimball et al. |
| 11,210,158 B2* | 12/2021 | Ramegowda ....... G06F 11/0784 |
| 2015/0066814 A1* | 3/2015 | Allen ...................... G06F 40/30 |
| | | 706/11 |
| 2019/0065343 A1 | 2/2019 | Li et al. |
| 2019/0163553 A1 | 5/2019 | Ramegowda et al. |
| 2020/0184355 A1 | 6/2020 | Mehta et al. |

(Continued)

OTHER PUBLICATIONS

Studiawan, Hudan et al., Anomaly Detection in Operating System Logs with Deep Learning-Based Sentiment Analysis, 2020, IEEE (Year: 2020).*

(Continued)

*Primary Examiner* — Marc Duncan
(74) *Attorney, Agent, or Firm* — Dan Housley; Andrew M. Calderon; Calderon Safran & Cole P.C.

(57) ABSTRACT

Methods, computer program products, and systems are presented. The methods include, for instance: creating a log data specific lexicon based on log data samples, each word in the log data specific lexicon corresponding to a weighted sentiment score with a binary polarity. A log message is obtained, and a sentiment value of the log message is assigned based on respective weighted sentiment scores of words appearing in the log message. The log message is classified for a class indicating an issue the log message addresses. An alert type for the log message is determined based on the sentiment value, the class, and a priority of the log message, and a system alert including a set of key performance indicators according to the alert type is produced to a user.

20 Claims, 8 Drawing Sheets

(56) References Cited

U.S. PATENT DOCUMENTS

| | | | | |
|---|---|---|---|---|
| 2020/0220768 | A1* | 7/2020 | Davis | G06F 17/40 |
| 2022/0012608 | A1* | 1/2022 | Lehmann | G06N 5/04 |
| 2022/0019935 | A1* | 1/2022 | Ghatage | G06F 11/3065 |
| 2022/0171800 | A1* | 6/2022 | Kumaresan | G06F 11/321 |
| 2023/0021373 | A1* | 1/2023 | Kabbinale | G06F 11/0712 |
| 2023/0084422 | A1* | 3/2023 | Shah | G06F 11/366 714/26 |

OTHER PUBLICATIONS

Baccianella, Stefano et al., SentiWordNet 3.0: an Enhanced Lexical Resource for Sentment Analysis and Opinion Mining, date unknown—retrieved 2023, Instituto di Scienza e Tecnologie dell'Informazione (Year: 2023).*

Syngal, Sonali et al., Server-Language Processing: a Semi-Supervised approach to Server Failure Detection, May 2021, ACM (Year: 2021).*

Tai, Yen-Jen et al., Automatic Domain-Specific Sentiment Lexicon Generation with Label Propagation, 2013, ACM (Year: 2013).*

Zhang, Di et al., SentiLog: Anomaly Detecting on Parallel File Systems via Log-based Sentiment Analysis, Jul. 2021, ACM (Year: 2021).*

Alharthi, Khalid Ayedh et al., Sentiment Analysis based Error Detection for Large-Scale Systems, 2021, IEEE (Year: 2021).*

Studiawan et al., "Sentiment Analysis in a Forensic Timeline with Deep Learning," IEEE Access, Digital Object Identifier 10.1109/ACCESS.2020.2983435, Published Mar. 26, 2020, vol. 8, pp. 60664-60675.

Mell, Peter, et al., "The NIST Definition of Cloud Computing", NIST Special Publication 800-145, Sep. 2011, Gaithersburg, MD, 7 pgs.

Meng et al., "LogAnomaly: Unsupervised Detection of Sequential and Quantitative Anomalies in Unstructured Logs," IJCAI, Proceedings of the Twenty-Eighth International Joint Conference on Artificial Intelligence (IJCAI-19), 2019, https://www.ijcai.org/proceedings/2019/0658.pdf, pp. 4739-4745.

* cited by examiner

| index | year | month | day | hour | window(m) | ID | Sentiment | Priority | CleanMessage | count | Alert_Filter |
|---|---|---|---|---|---|---|---|---|---|---|---|
| 0 | 19 | 11 | 4 | 4 | 0 | L10 | Negative | P2 | ip should have been configured as on this server | 2 | NotQualify |
| 1 | 19 | 11 | 4 | 4 | 0 | L3 | Negative | P2 | interface does not match | 2 | NotQualify |
| 2 | 19 | 11 | 4 | 4 | 0 | L32 | Negative | P2 | blv is not seen over trying to | 14 | Qualify |
| 3 | 19 | 11 | 4 | 4 | 0 | L34 | Negative | P2 | blv is not visible through excluding it from bootlist | 14 | Qualify |
| 4 | 19 | 11 | 25 | 5 | 6 | L10 | Negative | P2 | ip should have been configured as on this server | 1 | NotQualify |
| 5 | 19 | 11 | 25 | 5 | 6 | L3 | Negative | P2 | interface does not match | 1 | NotQualify |
| 6 | 19 | 11 | 25 | 5 | 6 | L32 | Negative | P2 | blv is not seen over trying to | 7 | Qualify |
| 7 | 19 | 11 | 25 | 5 | 6 | L34 | Negative | P2 | blv is not visible through excluding it from bootlist | 7 | Qualify |
| 8 | 19 | 11 | 25 | 5 | 6 | L39 | Negative | P1N | backup ip should have been diagnose | 1 | NotQualify |
| 9 | 19 | 11 | 25 | 5 | 6 | L40 | Negative | P1N | this domain has its own backup repo and backup gw is down | 1 | NotQualify |
| 10 | 19 | 11 | 25 | 5 | 6 | L43 | Negative | P2 | intended server not reachable ove backup | 1 | NotQualify |
| 11 | 19 | 11 | 25 | 5 | 6 | L45 | Negative | P2 | large file already excluded | 2 | NotQualify |
| 12 | 19 | 11 | 25 | 5 | 9 | L65 | Negative | P2 | os backup files not be transferred over backup | 1 | NotQualify |
| 13 | 19 | 11 | 25 | 5 | 9 | L66 | Negative | P2 | current response time of is expected below ms | 1 | NotQualify |
| 14 | 19 | 11 | 25 | 5 | 9 | L71 | Negative | P2 | wait while checking for on | 1 | NotQualify |
| 15 | 19 | 11 | 25 | 5 | 10 | L76 | Negative | P2 | wait for file transfer to is complete | 1 | NotQualify |

AUTOMATED SYSTEM ALERT BASED ON LOGS SENTIMENT ANALYSIS

TECHNICAL FIELD

The present disclosure relates to database transformation, and more particularly to methods, computer program products, and systems for automatically alerting system activities and status in real-time based on logs sentiment analysis by cognitive analytics and machine learning.

BACKGROUND

In computing environment, all hardware and software components in a working system generate respective logs. Most of information technology (IT) platforms monitor operations of the IT platforms and generate various types of logs including, at the operating system level on system functionalities, operational status of each system functionality, resource utilization, status information on the devices of the IT platform, and, at the application level, on application functionalities, any embedded functionalities of other software application, etc. The logs generated by the IT platforms are of numerous characteristics and various messages, some of which conveys information beneficial in improving performance of the IT platforms when a remedial measure according to the logs are timely applied to the IT platforms.

SUMMARY

The shortcomings of the prior art are overcome, and additional advantages are provided, through the provision, in one aspect, of a method. The method includes, for instance: creating, by one or more processors, a log data specific lexicon based on log data samples, each word in the log data specific lexicon corresponding to a weighted sentiment score with a binary polarity; obtaining, by the one or more processors, a log message from a computing platform; assigning, by the one or more processors, a sentiment value to the log message based on respective weighted sentiment scores of words appearing in the log message; classifying, by the one or more processors, the log message for a class indicating an issue the log message addresses; determining, by the one or more processors, an alert type for the log message based on the sentiment value, the class, and a priority of the log message, wherein the alert type is preconfigured with a set of alert type values of varying risk levels; and producing, by the one or more processors, a system alert to a user according to the alert type for the log message, where the system alert includes a predefined set of key performance indicators corresponding to the alert type to thereby inform the user on the issue addressed by the log message.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 depicts exemplary log messages curated for reporting per observed frequency via both blocks 340 and 350 of FIG. 3, in accordance with one or more embodiments set forth herein;

DETAILED DESCRIPTION

Figure 1:
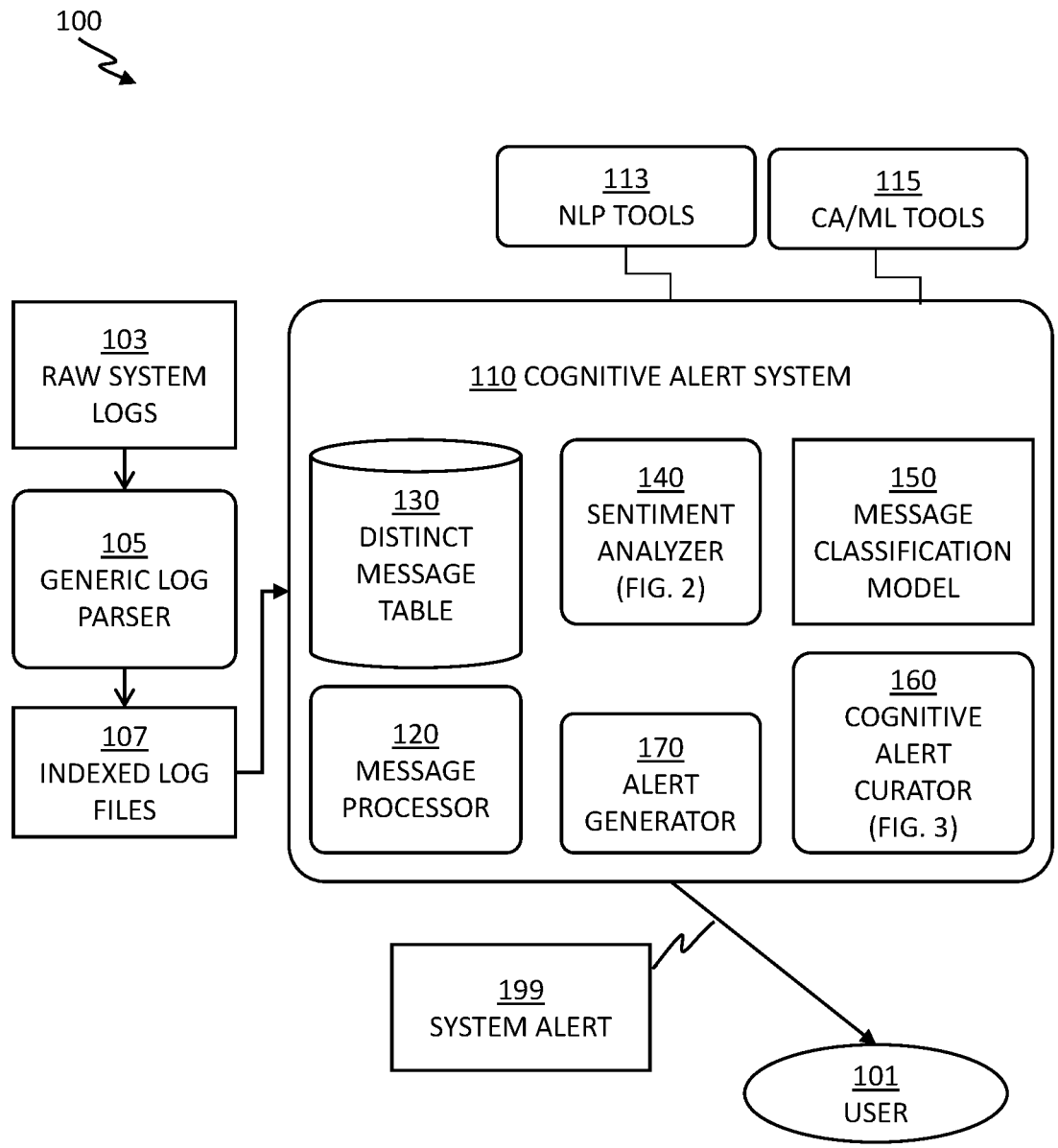
FIG. 1 depicts a system for automatically alerting system activities and status based on cognitive sentiment analysis on logs of a computing platform, in accordance with one or more embodiments set forth herein.

FIG. 1 depicts a system 100 for automatically alerting system activities and status based on cognitive sentiment analysis on logs of a computing platform, in accordance with one or more embodiments set forth herein.

In conventional system maintenance and administration context, all hardware and software components in computing platforms generate some form of records on status and operations, recorded as respective logs in the computing platforms. Most of the computing platforms monitor operations of the computing platforms at the operating system level, and individual devices and software applications generate preconfigured error codes or predefined text messages for the computing platforms. The computing platforms generate various types of logs including, at the operating system level on system functionalities, operational status of each system functionality, resource utilization, status information on the devices of the computing platform, and, at the application level, on application functionalities, any embedded software functionalities when used in a framework of another software application, etc. The logs generated by the computing platforms are of numerous characteristics and have corresponding parameters and various predefined text messages. Some of the logs convey information can benefit system performance and efficiency in operations of the computing platform when remedial measures according to the logs are timely applied to the computing platforms. However, because the logs generated from the computing platforms are quite large in numbers and because information of the logs are often presented in preconfigured codes and short form descriptions intended for machine interface internal to the computing platforms, it is hard to have the log message noticed by a human administrator of the computing platforms to have the logs understood in time and have a remedial action taken accordingly.

The system 100 includes a cognitive alert system 110 reporting a system alert 199 to a user 101 based on inputs of indexed log files 107. The indexed log files 107 are generated by a generic log parser 105 running in a computing platform as raw system logs 103 of the computing platform are processed. In certain embodiments of the present invention, the indexed log files 107 are collected from respective Elasticsearch indices or Apache Kafka topics. (Elasticsearch is a trademark of Elasticsearch B. V., registered in the U.S. and in other countries; Apache is a trademark of the Apache Software Foundation in the United States and/or other countries.)

The cognitive alert system 110 includes a message processor 120, a distinct message table 130, a sentiment analyzer 140, a message classification model 150, a cognitive alert curator 160, and an alert generator 170. The cognitive alert system 110 is operatively coupled to external tools including, but not limited to, natural language processing (NLP) tools 113 and cognitive analytics/machine learning (CA/ML) tools 115. The cognitive alert system 110 also includes a configuration file specifying an account of the user 101 to which the system alert 199 is transferred, a type of the system alert 199, types of input log sources, and other parameters and corresponding values to configure operations of the cognitive alert system 110.

The message processor 120 processes the log messages in the indexed log files 107 into text log messages and data by removing special characters and noises inserted for data separation and formatting according to a configuration file for the cognitive alert system 110. The message processor 120 then extracts data entities required for operations of the cognitive alert system 110 and the system alert 110. The data entities extracted by the message processor 120 can be configured individually per account holder, based on the areas of interest on which the user 101 wish to be reported. The message processor 120 generates distinct messages based on the extracted data entities and stores the distinct messages in the distinct message table 130 with a newly created message index, also referred to as an identifier, for each of the distinct messages.

In certain embodiments of the present invention, the message processor 120 creates a dataframe (DF) to organize data entities and other information in the distinct messages. In this specification, term "dataframe" indicates a data structure based on Apache Spark DataFrame, which is the most common structured API that represents a table of data with rows and columns, which can be partitioned across many data centers to store very large amount of data, often referred to as big data, and to process the big data efficiently. In the same embodiments of the present invention, the message processor 120 removes special characters and duplicates from the log messages and converts timestamps in the log messages to a date-time form for Python API for Apache Spark for easily integrate Resilient Distributed Dataset (RDD) of Spark into Python programs. In the same embodiments of the present invention, the message processor 120 creates columns additional to the DF by extracting data entities such as Host Name, Internet Protocol Address (IP), Job Name, Application Name, etc., relevant to the log message. The message processor 120 then creates a column "Clean Message" by keeping text portion of the log messages that is constant, as the numeric and/or alpha numeric portions of the log message have been extracted as separate data entities and respective columns have been previously created. As all variable portions of the log messages have been separated, the text of the "CleanMessage" column can repeatedly appear in many log messages. Accordingly, the message processor 120 takes one of distinct message texts from "CleanMessage" column and create another dataframe (DF1) for a unique message, which will be a data structure for the distinct message table 130 of the cognitive alert system 110. The message processor 120 adds a new column "ID" in the DF1 as an identifier for each distinct message in the distinct message table 130.

The sentiment analyzer 140 cognitively analyzes the distinct messages stored in the distinct message table 130 and determines a sentiment value expressed in each of the distinct messages. The sentiment analyzer 140 updates the respective log messages in the distinct message table 130 with the newly assigned sentiment values associated with respective log messages in the distinct message table 130. The sentiment analyzer 140 creates and utilizes a log message lexicon indicating how a particular word would have a certain sentiment value when used in log messages. The sentiment analyzer 140 also weighs each word in the log message lexicon based on how critical an issue that is being addressed by the word in the log message lexicon. The log message lexicon would be continuously readjusted and updated with the weights and a custom sentiment when a certain user feedback to affect the sentiment previously associated with the word in the log message lexicon. Detailed operations of the sentiment analyzer 140 are presented in FIG. 2 and corresponding description.

Figure 2:
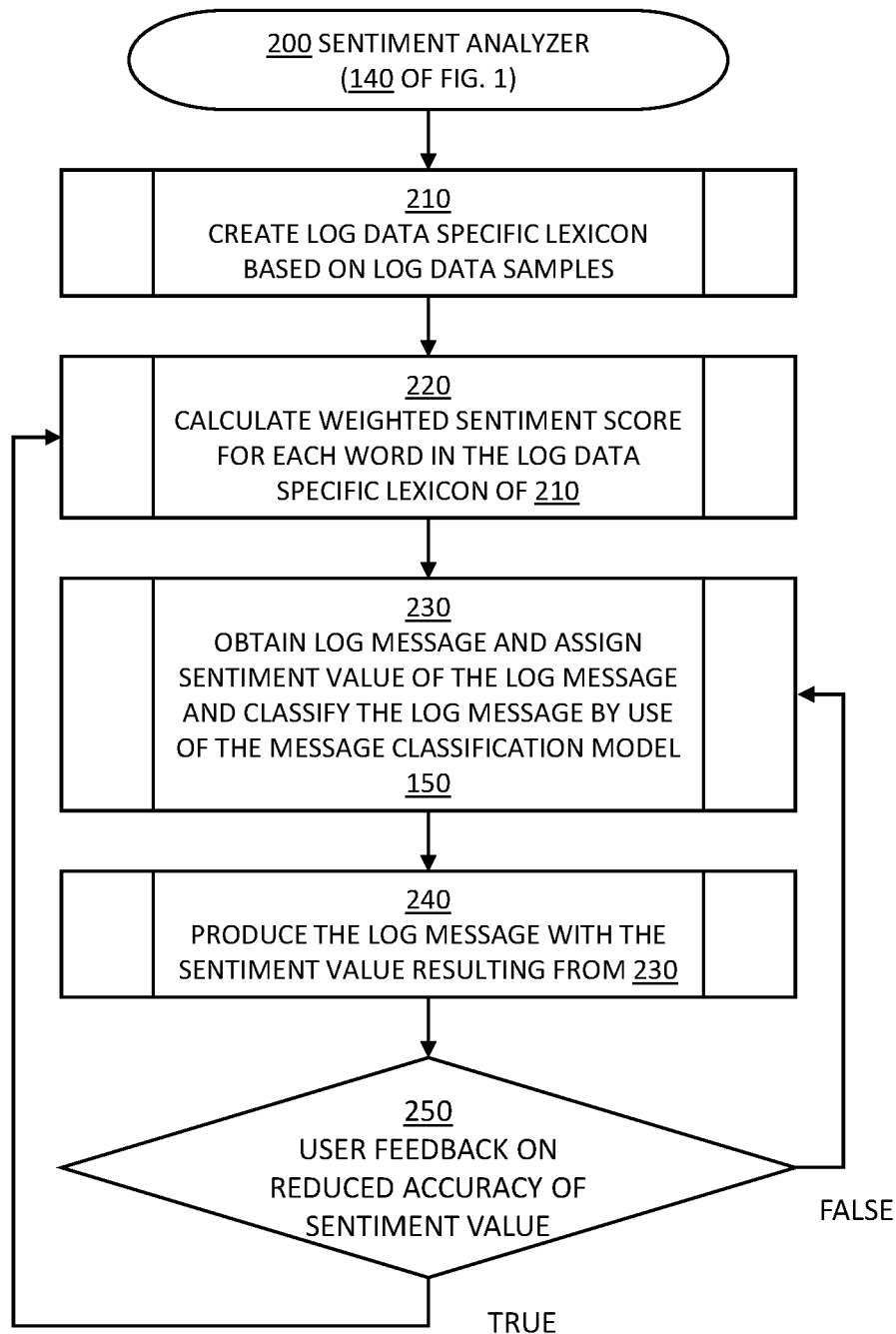
FIG. 2 depicts a flowchart of operations performed by the sentiment analyzer of FIG. 1, in accordance with one or more embodiments set forth herein.

In certain embodiments of the present invention, the sentiment analyzer 140 utilizes a method described in FIG. 2 in combination with currently available sentiment analysis tools. For example, the sentiment analyzer 140 may employ SentiWordNet which is an opinion lexicon derived from the WordNet database where each term is associated with numerical scores indicating positive and negative sentiment information often used for sentiment classification in NLP along with the log message lexicon. Accordingly ordinary words in log messages can be readily scored for a sentiment and classified based on SentiWordNet, while for a sentiment of any context specific words in the log messages a SentiWordNet score would be assessed and/or weighted based on a context of a log message for accuracy. In certain embodiments of the present invention, a sentiment value associated with a distinct message is preconfigured to one of binary values {Positive, Negative}, where the sentiment value of the distinct message is assigned to "Positive" if the distinct message represents a positive event or activity in the computing platform, and if the distinct message represents a negative event or activity in the computing system, then the sentiment value of the distinct message would be assigned to "Negative". The determination on negative/positive activities and events are trained into a machine learning model based on historical logs and user responses corresponding to each of the historical logs.

The message classification model 150 is a hybrid classification model utilizes for the distinct log messages in the distinct message table 130. In certain embodiments of the present invention, the message classification model 150 utilizes a classical part-of-speech method and a similarity method to classify the distinct log messages stored in the distinct message table 130. The categories for the message classification model 150 can be configured with a priority referring to a level of urgency of the services/issue on function of the computing platform, a class referring to a relevant functionality and/or resource(s) addressed by the log message, a frequency of the log message within a predefined time window if not addressed in real time, etc. In this specification, terms "class", "issue", or "label" of a log message indicate a functionality of the computing platform that is being addressed by the log message.

In the embodiments of the present invention same as the message processor 120 creates two (2) dataframes DF and DF1 as above, the sentiment analyzer 140 creates a new column "Sentiment" in DF1 and assigns a sentiment value, one of {"Positive", "Negative"} to each distinct message stored in the distinct message table 130. The sentiment analyzer 140 determines the sentiment value respective to each of the distinct messages stored in the distinct message table 130 by applying a hybrid method for sentiment value assessment described in block 230 of FIG. 2 below. The message classification model 150 creates an additional column "Category" in DF1 and instantiates with a label phrase combining negative words in the distinct message. The terms "category", "label", "issue", and "class" are used interchangeably to address what is the problem that is being alerted with the distinct message. In the same embodiments of the present invention, the cognitive alert system 110 utilizes the message classification model 150 that employs a custom part-of-speech (POS) classification method in combination with a similarity-based classification. The cognitive alert system 110 then merges DF and DF1 to add columns "ID" for identifying distinct messages and "Sentiment" as assessed to the log message dataframe DF. The cognitive alert system 110 filters input log messages with a "Negative" sentiment value from the log message dataframe DF and send to the cognitive curator 160 for alerting.

The cognitive alert curator 160 examines the sentiment value and the class of the log message and determines a type of alert for the log message based on the class and the sentiment value associated with the log message. Detailed operations of the cognitive alert curator 160 are presented in FIG. 3 and corresponding description.

Figure 3:
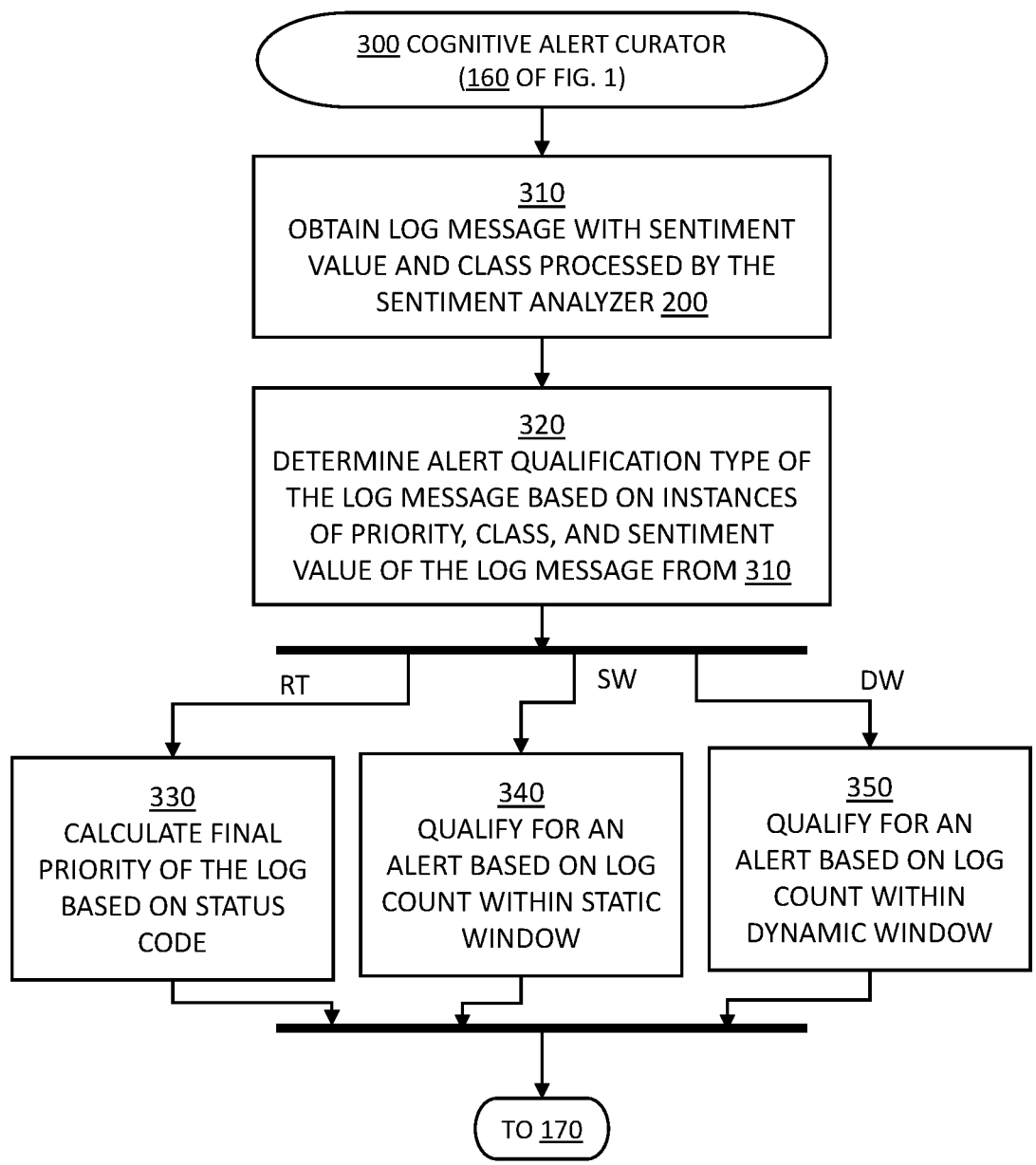
FIG. 3 depicts a flowchart of operations performed by the cognitive alert curator of FIG. 1, in accordance with one or more embodiments set forth herein.

As shown in FIG. 3, the cognitive alert curator 160 utilizes three (3) types of qualifications for alerts based on a combination of a priority, a class, and a sentiment value associated with the log message. The cognitive alert curator 160 defines the types of alert qualification as {Real-time alert, Frequency based alert}, where the Frequency based alert type has two (2) subcategories of {Static window, Dynamic window}.

In certain embodiments of the present invention, the cognitive alert curator 160 implements two (2) sets of key performance indicators (KPIs) from negative intent logs based on urgency of alerting the user 101. A first set of KPIs is utilized to alert for a type of negative intent logs that needs attention by the user 101 immediately. Accordingly, a real time alert will be reported with the first set of KPIs. Exemplary alerts based on the first set of KPIs are presented in FIG. 4 and corresponding description. The real time alerts are reported in real time as individual log message with modified priorities according to respective error codes appearing in the negative intent logs such as "Info", "Warn", and "Error".

In the same embodiment of the present invention as above, the cognitive alert curator 160 configures a second set of KPIs to report a group of negative intent logs that would be alerted based on a frequency of each of the negative intent logs. The cognitive alert curator 160 determines a time window, in a range from a few to several minutes, and counts how many of the same negative intent logs are generated. Based on a preconfigured threshold count of the log messages, the cognitive alert curator 160 qualifies the negative intent logs for alerting if the negative intent logs had been generated more times than the preconfigured threshold count. In the same embodiments of the present invention, the cognitive alert curator 160 determines how long the time window would be for new logs observation, if the time window should be fixed or should be adjusted such that some log messages would be observed for more time than other log messages, and if the preconfigured threshold count would be fixed or to be adjusted. For example, the cognitive alert curator 160 can be configured to qualify a log message arriving three (3) times within one (1) minute of static time window as an alert. In the same embodiments of the present invention, the cognitive alert curator 160 qualifies grouped messages in related issues using statistical analysis-based baselines from machine learning/deep learning anomaly detection models.

Embodiments of the present invention improves accuracy in sentiment values and overcomes drawbacks in conventional attempts to analyze sentiment of log messages caused by literature-based lexicon or other generic vocabulary common in conventional NLP by creating and adopting a custom lexicon specific to log messages. Conventional sentiment analysis based on generic vocabulary often produces an inaccurate sentiment value for log message, as the context and usage of words are different from regular literature in log messages. For example, a phase "high utilization" may be analyzed as having a positive sentiment value in regular literature, but "high utilization" in a log message indicates a low availability of the same resource and thus a negative sentiment value should be assigned for the log message having "high utilization".

Conventionally, lexicon-based sentiment analysis and prelabelled data-based sentiment analysis are widely used for sentiment analysis of log messages but the sentiment values produced for log messages are not accurate enough to be usable. On the other hand, simply performing a big data research of the log data does not produce much results in identifying patterns of abnormal system activities, diagnosing root causes of a certain outages does not employ sentiment analysis specific for log messages. Further, because conventional log analysis methods often focus on filtering log messages having high-risk terminologies such as 'error', 'information', 'warning', for alerts but does not analyse the log messages for information on subtle abnormalities in system operations and root causes of certain outages that can be prevented.

Embodiments of the present invention facilitates fully automated analysis of log messages in computing platforms based on cognitive sentiment analysis specific to log messages. The embodiments of the present invention cognitively curate types of alerts to improve efficiency in a recovery from a service outage reported in a critical alert in real-time. By use of the cognitive curation of alert types, the embodiments of the present invention cognitively also facilitate proactive remedies for any chronic issues with a certain performance degradation as reported in non-critical alerts, which improves efficiency of the computing platform over time. The embodiments of the present invention improve visibility and readability of log messages greatly according to respective priority and related issue, which had been performed manually in small scale or not performed at all without the cognitive alert system 110.

FIG. 2 depicts a flowchart of operations performed by the sentiment analyzer 140 of FIG. 1, in accordance with one or more embodiments set forth herein.

In block 210, the sentiment analyzer 140 creates a log data specific lexicon based on log data samples gathered across a plurality of platforms of a compatible architecture and capacity. The sentiment analyzer 140 does not use any of natural language literatures often used as basis of a lexicon such as generic social network comments except technical discussion websites in building the log data specific lexicon. Then, the sentiment analyzer 140 proceeds with block 220.

In block 220, the sentiment analyzer 140 calculates a weighted sentiment score for each word in the log data specific lexicon generated from block 210. In this specification, terms "weighted sentiment score", "weight", or "weighted score" are used interchangeably. The log data specific lexicon includes all English words appearing in the log data samples. The sentiment analyzer 140 assigns each word in the log data specific lexicon with weight scores for both positive and negative polarities. These weights are derived for every word based on meanings and intents of the word in a context of log messages. As noted, the same word may mean differently in the context of the log messages from natural language contexts. For example, "utilization" is a word in general has a positive or neutral in natural language world but log messages such as "High utilization of memory leads slow response in the process", "High disk space utilization on the server abc123", indicates a lack of available resources or performance degradation caused thereby. Accordingly, "utilization" in the context of log messages will have negative weight. Then, the sentiment analyzer 140 proceeds with block 230.

In block 230, the sentiment analyzer 140 obtains a log message to analyze and assigns a sentiment value to the log message as a sum of weighted sentiment scores corresponding to words in the log message, as well as classifies the log message by use of the message classification model 150. The sentiment analyzer 140 assigns a class, also referred to as a label, an issue, or an intent, to the log message that specifies which functionality of the computing platform is being addressed by the log message, by use of the message classification model 150.

In certain embodiments of the present invention, the sentiment analyzer 140 adds weights of all negative intent words in the log message and assigns a positive sentiment value if the sum of negative word weights is equal to zero (0), that is, if no negative intent words are present in the log message. Otherwise, the sentiment analyzer 140 assigns a negative sentiment value to the log message. The sentiment analyzer 140 determined how critical the log message is based on the quantity of the sum of negative weights for the log message. If the sentiment analyzer 140 discovers there are multiple sentences in the log message, the sentiment analyzer 140 splits the log message and classifies every sentence and assigns respective sentiment values which results in finding the exact issue more efficiently. Then, the sentiment analyzer 140 proceeds with block 240.

In block 240, the sentiment analyzer 140 produces the log message with the sentiment value as assigned from block 230 to the cognitive alert curator 160. See description of FIG. 1 or block 250 below regarding subsequent workflow on the log message by the cognitive alert system 110. Then, the sentiment analyzer 140 proceeds with block 250.

In block 250, the sentiment analyzer 140 determines whether or not any user feedback had been received regarding a reduced accuracy of the sentiment value of the log message. Between block 240 and block 250, a type of alert for the log message is determined by the cognitive alert curator 160, then an alert corresponding to the determined type is generated by the alert generator 170 on the log message, and finally presented to the user 101 as the system alert 199. If the sentiment analyzer 140 had received some user feedback commenting that the accuracy of the sentiment value of the log message had been reduced, then the sentiment analyzer 140 loops back to block 220 to recalculate the sentiment scores to respective words in the log data specific lexicon such that the accuracy of the sentiment value would be improved, and the weighted scores are readjusted across the log data specific lexicon. If the sentiment analyzer 140 had not received user feedback regarding reduced accuracy at all, then the sentiment analyzer 140 loops back to block 230 to process a next log message.

FIG. 3 depicts a flowchart of operations performed by the cognitive alert curator 160 of FIG. 1, in accordance with one or more embodiments set forth herein.

In block 310, the cognitive alert curator 160 obtains the log message with the sentiment value and the class as produced by the sentiment analyzer 140 at block 230 in FIG. 2. Then, the cognitive alert curator 160 proceeds with block 320.

In block 320, the cognitive alert curator 160 determines an alert type of the log message based on instances of priority, class, and sentiment value of the log message from block 310. As noted above, in certain embodiments of the present invention, a size of the weighted negative score would indicate how critical an issue is addressed by the log message. In the same embodiment as above where there are three alert types, the cognitive alert curator 160 determines one of {Real-time, Static window, Dynamic window} as the alert type for the log message. If the cognitive alert curator 160 determines that the alert type for the log message is "Real-time" as being critical and to report immediately, then the cognitive alert curator 160 proceeds with block 330. If the cognitive alert curator 160 determines that the alert type for the log message is "Static window" as being less than critical and to observe for a static time window on how many more identical log messages would arrive, then the cognitive alert curator 160 proceeds with block 340. If the cognitive alert curator 160 determines that the alert type for the log message is "Dynamic window" as being less than critical and to observe for a dynamic time window on how many more identical log messages would arrive, then the cognitive alert curator 160 proceeds with block 350.

In block 330, the cognitive alert curator 160 recalculates the priority of the log based on status code as being curated as critical for immediate alert. Then the cognitive alert curator 160 terminates and the log message proceeds to the alert generator 170.

In block 340, the cognitive alert curator 160 first observes how many more identical log messages would arrive for the static time window. If the cognitive alert curator 160 observes a number of the identical log messages greater than or equal to a threshold count for alerting within the static time window, then the cognitive alert curator 160 forwards the log message to the alert generator 170 and terminates. If the cognitive alert curator 160 observes a number of the identical log messages less than the threshold count for alerting within the static time window, then the cognitive alert curator 160 terminates without forwarding the log message to the alert generator 170.

In block 350, the cognitive alert curator 160 first observes how many more identical log messages would arrive for the dynamic time window. If the cognitive alert curator 160 observes a number of the identical log messages greater than or equal to a threshold count for alerting within the dynamic time window, then the cognitive alert curator 160 forwards the log message to the alert generator 170 and terminates. If the cognitive alert curator 160 observes a number of the identical log messages less than the threshold count for alerting within the dynamic time window, then the cognitive alert curator 160 terminates without forwarding the log message to the alert generator 170.

The alert generator 170 creates alerts for all log messages that had been qualified from blocks 330, 340, and 350. In certain embodiments of the present invention same as above where the message processor 120 takes inputs of the indexed log files 107 from respective Elasticsearch indices or Apache Kafka topics, the alert generator 170 sends all qualified logs that had been produced as the system alert 199 to Apache Kafka topic or stores in Elasticsearch index.

Figure 4:
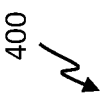
FIG. 4 depicts exemplary alerts curated for real-time reporting via block 330 of FIG. 3, in accordance with one or more embodiments set forth herein.

FIG. 4 depicts exemplary alerts 400 curated for real-time reporting via block 330 of FIG. 3, in accordance with one or more embodiments set forth herein.

The alert generator 170 generates the exemplary alerts 400 subsequent to block 330 by the cognitive alert curator 160, determining the alert as of the Real-time type from block 320 based on a preconfigured set of KPIs including columns of Index 401, Timestamp 402, CleanMessage 403, Final_class 404, ID 405, Model_Type 406, Sentiment 407, and Priority 408. Each row in the exemplary alerts 400 indicates a log message that is being alerted. Values in column Index 401 indicate an index of the log message. Values in column Timestamp 402 indicate a time stamp of the log message, in a converted form for Python API. Values in column CleanMessage 403 indicate message text without any variables as stored in the distinct message table 130. Values in column Final_class 404 indicate an issue label of the log message as classified by the sentiment analyzer 140 using the message classification model 150. Values in column ID 405 indicate a unique identifier of a distinct message from the distinct message table 130. Values in column Model_Type 406 indicate a name of a model by which the values in column Final_class is generated. Value "sim model" for the column Model_Type 406 indicates a similarity model for classification, and value "POS_model" for the column Model_Type 406 indicates a parts-of-speech model specific to the log data specific lexicon. Values in column Sentiment 407 indicate respective sentiment values of the log message, which are all "Negative" in the exemplary alerts 400 as no log message with Positive sentiment value would be alerted to the user 101. Values in column Priority 408 indicate a priority configured/assessed for the log message.

FIG. 5 depicts exemplary log messages 500 curated for reporting per observed frequency via both blocks 340 and 350 of FIG. 3, in accordance with one or more embodiments set forth herein.

As noted for FIG. 4, the alert generator 170 generates the system alert 199 based on some of the exemplary log messages 500 subsequent to block 340 or 350 by the cognitive alert curator 160, determining the log message had qualified as the system alert 199 because the log message had been generated more times within the respective time windows than the preconfigured threshold count for alerting.

The second preconfigured set of KPIs noted above in FIG. 1 includes columns of Index 501, year 502, month 503, day 504, hour 505, window (m) 506, ID 507, Sentiment 508, Priority 509, CleanMessage 510, count 511 and Alert Filter 512. As in FIG. 4, each row in the exemplary log messages 500 indicates a log message. The exemplary log messages 500 show all candidate log messages but only the log messages of Index 501 values "2", "3", "6", and "7" would be sent to the user 101 as the system alert 199 as column Alert Filter 512 values "Qualify" respectively indicate, based on qualifying threshold values and values in column window(m) 506 and column count 511 for respective log messages. As noted for FIG. 4 Values in column Index 501 indicate an index of the log message, values in column ID 507 indicate a unique identifier of a distinct message from the distinct message table 130, values in column Priority 509 indicate a priority configured/assessed for the log message, values in column CleanMessage 510 indicate message text without any variables as stored in the distinct message table 130.

Certain embodiments of the present invention improve accuracy of sentiment analysis in log messages by use of an adaptive log data specific lexicon and a customized sentiment analysis method by weighing conventional sentiment score of each word based on meaning and purpose of the log message. Certain embodiments of the present invention classify log messages more accurately than conventional NLP classification based on a message classification model optimized for identifying issues from clean texts in log messages. Certain embodiments of the present invention provide the cognitive alert curator which determines a type of qualification based on priority and class of the log message. Certain embodiments of the present invention provide the system alert in real-time based on preconfigured class and priority of a log message to thereby facilitate resolution of an issue addressed in the log message. Certain embodiments of the present invention provide a frequency-based system alert by counting a number of occurrences of a same log message within a time window and qualify a certain log message as the system alert when the log message has occurred more than a threshold count during the time window, to thereby facilitate alerting the user on consistent and frequently reported issue addressed by the log messages. Certain embodiments of the present invention may be implemented by use of a cloud platform/data center/server farm in various types including a Software-as-a-Service (SaaS), Platform-as-a-Service (PaaS), Database-as-a-Service (DBaaS), and combinations thereof based on purpose of the cognitive alert system. The cognitive alert system on any hardware platform can be offered for and delivered to any service providers/business entities/vendors of software applications from any location in the world in need of more efficient system administration, discovery of root causes of any problems addressed in the log messages, and resolution of issues that often overlooked by the user due to low visibility and readability of the log messages.

Embodiments of the present invention present a computer implemented method including, for instance: creating, by one or more processors, a log data specific lexicon based on log data samples, each word in the log data specific lexicon corresponding to a weighted sentiment score with a binary polarity; obtaining, by the one or more processors, a log message from a computing platform; assigning, by the one or more processors, a sentiment value to the log message based on respective weighted sentiment scores by the log data specific lexicon corresponding to words appearing in the log message; classifying, by the one or more processors, the log message for a class indicating an issue the log message addresses; determining, by the one or more processors, an alert type for the log message based on the sentiment value, the class, and a priority of the log message, where the alert type is preconfigured with a set of alert type values of varying risk levels; and producing, by the one or more processors, a system alert to a user according to the alert type for the log message, where the system alert includes a predefined set of key performance indicators corresponding to the alert type to thereby inform the user on the issue addressed by the log message.

Embodiments of the present invention present a computer implemented method also including, for instance: processing the log message, prior to the assigning, by separating text of the log message as resulting from removing special characters of the log message and extracting parameters and values of the log messages as respective data entities; allocating an identifier for a unique text of the log message;

and storing the unique text of the log message in a distinct message table if the unique text of the log message is not already present.

Embodiments of the present invention present a computer implemented method also including, for instance: determining respective sentiment scores of the words appearing in the log message by use of a sentiment lexicon available in natural language processing as being applied to the log data specific lexicon; weighing the respective sentiment scores of the words in the log message based on a meaning of each of the words in log message contexts; and determining a sum of all of the weighted sentiment scores respective to each of the words in the log message as the sentiment value to the log message.

Embodiments of the present invention present a computer implemented method also including, for instance: determining, subsequent to the determining the alert type, a set of key performance indicators corresponding to the alert type, wherein the set of alert type values comprises Real time, wherein if the alert type is Real time then the log message is immediately alerted to the user with the key performance indicators comprising a timestamp, a text-only message, the class, an identifier of a distinct message, the sentiment value, and the priority of the log message.

Embodiments of the present invention present a computer implemented method also including, for instance: determining, subsequent to the determining the alert type, a set of key performance indicators corresponding to the alert type, where the set of alert type values comprises Static time window and Dynamic time window, where if the alert type is Static time window then the log message is alerted only when the log message is repeated more times than a threshold count of the log message within a predefined static time window, and where the log message is alerted to the user with the key performance indicators comprising an arrival time of the log message, a time window for the log message to be repeated, the sentiment, the priority, a text-only message as identified by a distinct message, the sentiment value, and the priority of the log message, a count of the log message indicating how many times the log message has been repeated within the time window, and an alert filter indicating whether or not the count of the log message is greater than a threshold count to qualify as the alert.

Embodiments of the present invention present a computer implemented method also including, for instance: performing a part-of-speech analysis on the log message by use of natural language processing tools; collecting nouns of the log message resulting from the part-of-speech analysis and forming noun phrases in the log message with any immediately consecutive nouns in the log message; and determining a noun phrase with the greatest number of characters as the class of the log message.

Embodiments of the present invention present a computer implemented method also including, for instance: obtaining a user feedback commenting on a reduced accuracy of the weighted sentiment score for a group of words in the log data specific lexicon; and reassessing the weighted sentiment score with the binary polarity for each word in the group of words in the log data specific lexicon based on a new log data samples.

Figure 6:
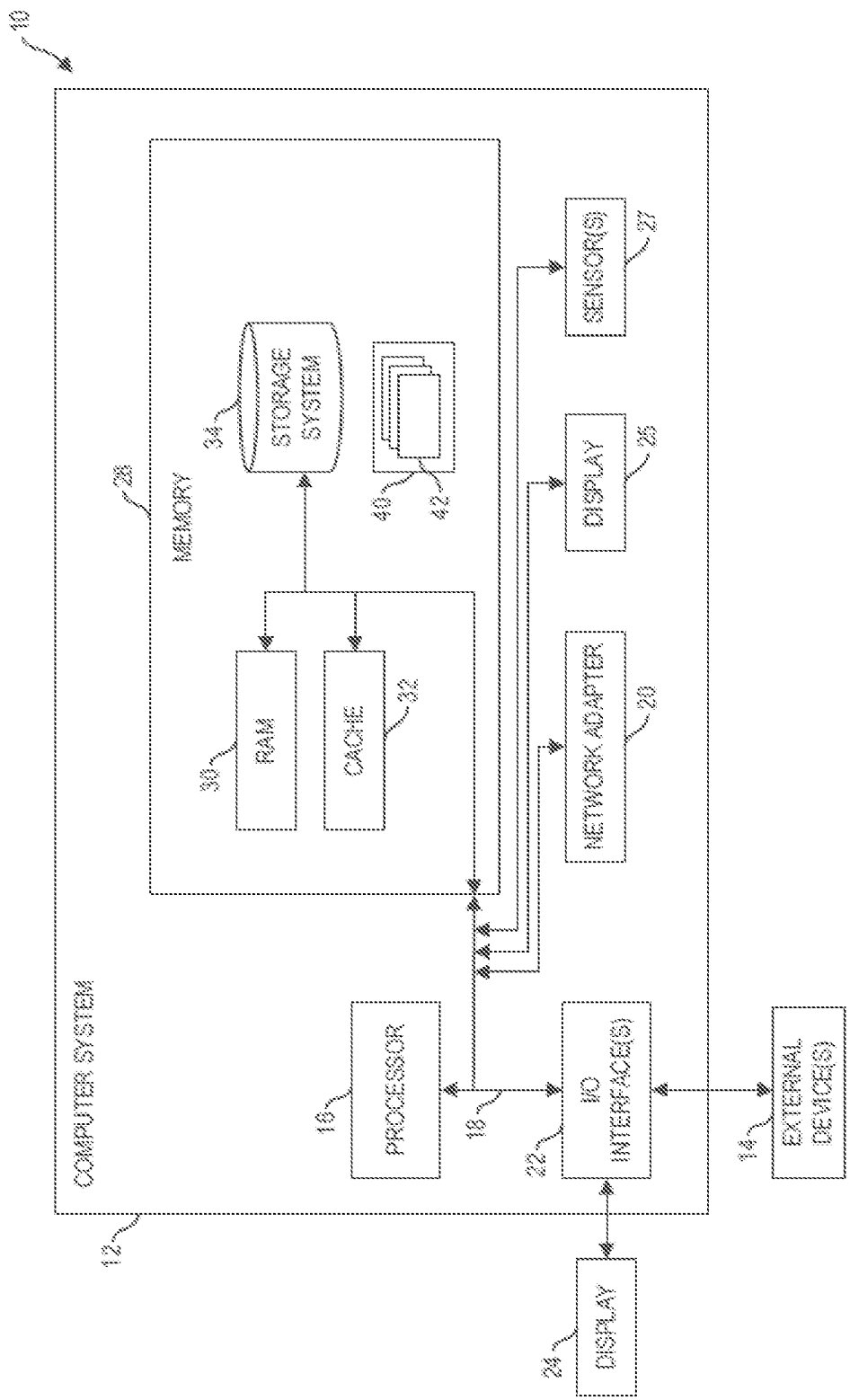
FIG. 6 depicts a cloud computing node according to an embodiment of the present invention.
Figure 7:
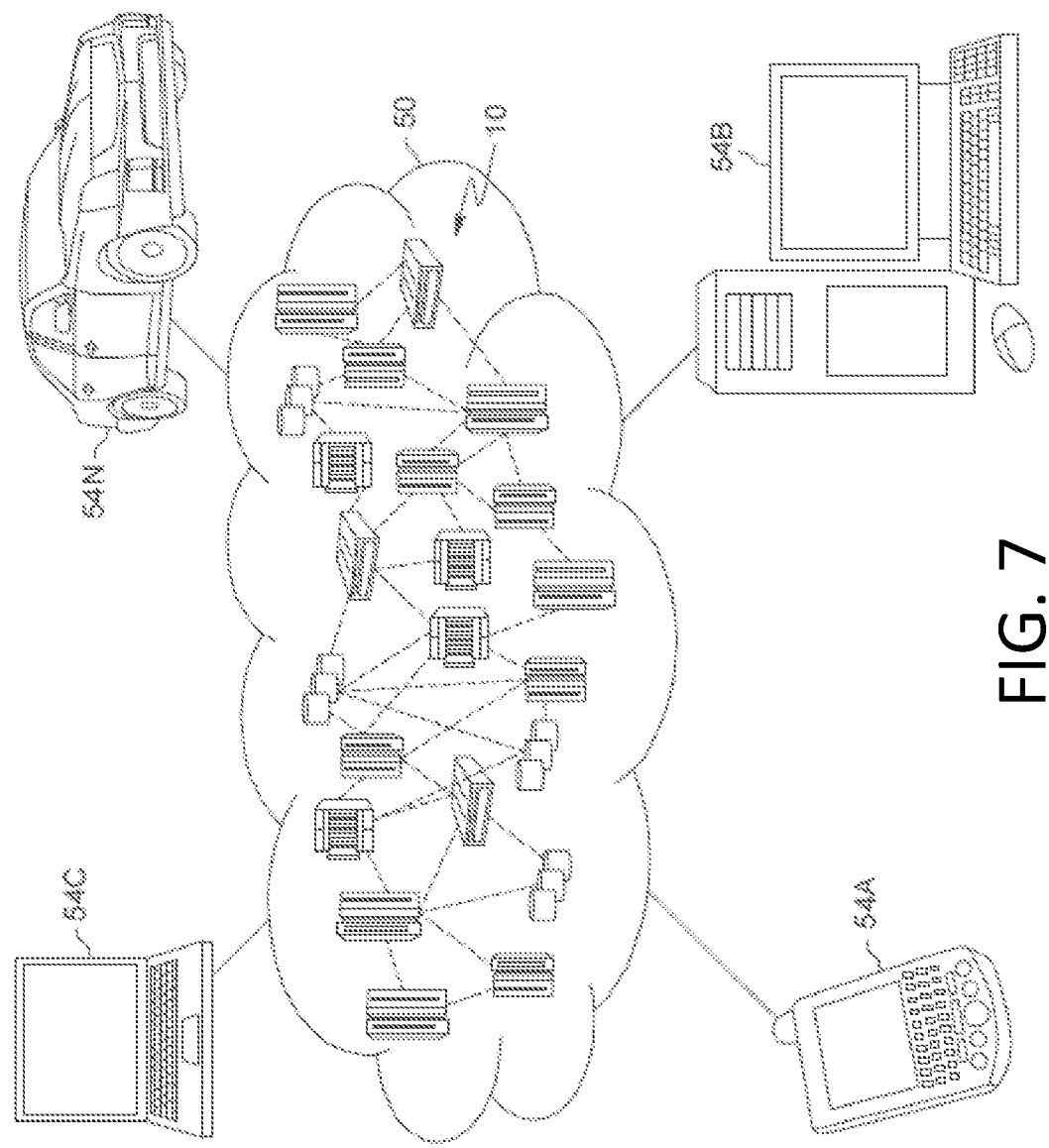
FIG. 7 depicts a cloud computing environment according to an embodiment of the present invention.
Figure 8:
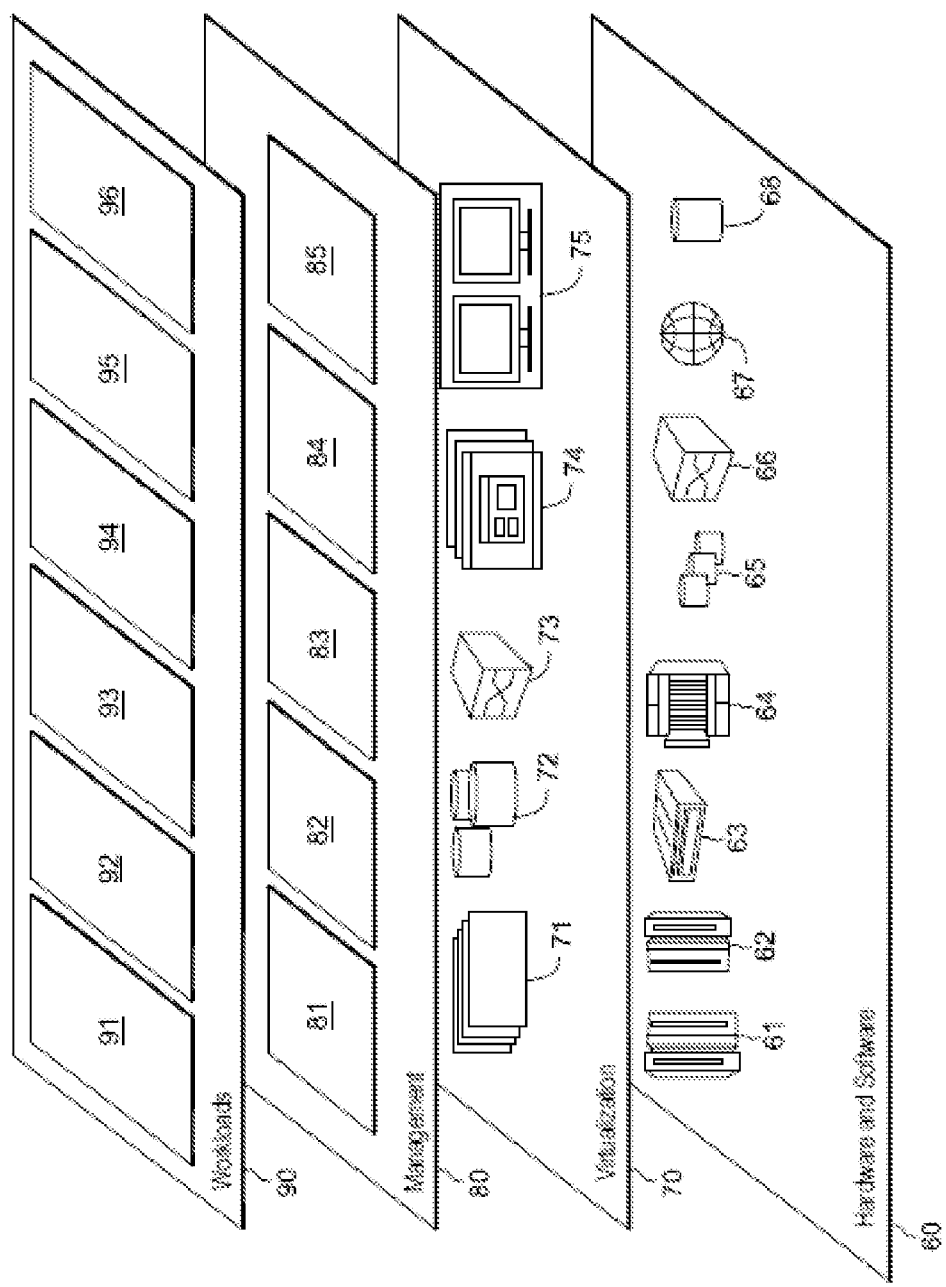
FIG. 8 depicts abstraction model layers according to an embodiment of the present invention.

FIGS. 6-8 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purposes or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the cognitive alert system 110 of FIG. 1. Program processes 42, as in the cognitive alert system 110 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, Redundant Array of Independent/Inexpensive Disks (RAID) systems, tape drives, and data archival storage systems, etc.

Referring now to FIG. 7, illustrative cloud computing environment 50 is depicted. As shown, cloud computing environment 50 includes one or more cloud computing nodes 10 running the cognitive alert system 110 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the cognitive alert system 110 including the sentiment analyzer and the cognitive alert curator 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:
1. A computer implemented method comprising:
    creating, by one or more processors, a log data specific lexicon based on log data samples, each word in the log data specific lexicon corresponding to a weighted sentiment score with a binary polarity;

obtaining, by the one or more processors, a log message from a computing platform;

assigning, by the one or more processors, a sentiment value to the log message based on respective weighted sentiment scores by the log data specific lexicon corresponding to words appearing in the log message;

classifying, by the one or more processors, the log message for a class indicating an issue the log message addresses;

determining, by the one or more processors, an alert type for the log message based on the sentiment value, the class, and a priority of the log message, wherein the alert type is preconfigured with a set of alert type values of varying risk levels; and producing, by the one or more processors, a system alert to a user according to the alert type for the log message, wherein the system alert comprises a predefined set of key performance indicators corresponding to the alert type to thereby inform the user on the issue addressed by the log message.

2. The computer implemented method of claim 1, further comprising:

processing the log message, prior to the assigning, by separating text of the log message as resulting from removing special characters of the log message and extracting parameters and values of the log messages as respective data entities;

allocating an identifier for a unique text of the log message; and storing the unique text of the log message in a distinct message table if the unique text of the log message is not already present.

3. The computer implemented method of claim 1, the assigning comprising:

determining respective sentiment scores of the words appearing in the log message by use of a sentiment lexicon available in natural language processing as being applied to the log data specific lexicon;

weighing the respective sentiment scores of the words in the log message based on a meaning of each of the words in log message contexts; and determining a sum of all of the weighted sentiment scores respective to each of the words in the log message as the sentiment value to the log message.

4. The computer implemented method of claim 1, further comprising:

determining, subsequent to the determining the alert type, a set of key performance indicators corresponding to the alert type, wherein the set of alert type values comprises Real time, wherein if the alert type is Real time then the log message is immediately alerted to the user with the key performance indicators comprising a timestamp, a text-only message, the class, an identifier of a distinct message, the sentiment value, and the priority of the log message.

5. The computer implemented method of claim 1, further comprising:

determining, subsequent to the determining the alert type, a set of key performance indicators corresponding to the alert type, wherein the set of alert type values comprises Static time window and Dynamic time window, wherein if the alert type is Static time window then the log message is alerted only when the log message is repeated more times than a threshold count of the log message within a predefined static time window, and wherein the log message is alerted to the user with the key performance indicators comprising an arrival time of the log message, a time window for the log message to be repeated, the sentiment, the priority, a text-only message as identified by a distinct message, the sentiment value, and the priority of the log message, a count of the log message indicating how many times the log message has been repeated within the time window, and an alert filter indicating whether or not the count of the log message is greater than a threshold count to qualify as the alert.

6. The computer implemented method of claim 1, the classifying comprising:

performing a part-of-speech analysis on the log message by use of natural language processing tools;

collecting nouns of the log message resulting from the part-of-speech analysis and forming noun phrases in the log message with any immediately consecutive nouns in the log message; and determining a noun phrase with the greatest number of characters as the class of the log message.

7. The computer implemented method of claim 1, further comprising:

obtaining a user feedback commenting on a reduced accuracy of the weighted sentiment score for a group of words in the log data specific lexicon; and reassessing the weighted sentiment score with the binary polarity for each word in the group of words in the log data specific lexicon based on a new log data samples.

8. A computer program product comprising:

a computer readable storage medium readable by one or more processors and storing instructions for execution by the one or more processors for performing a method comprising:

creating a log data specific lexicon based on log data samples, each word in the log data specific lexicon corresponding to a weighted sentiment score with a binary polarity;

obtaining a log message from a computing platform;

assigning a sentiment value to the log message based on respective weighted sentiment scores by the log data specific lexicon corresponding to words appearing in the log message;

classifying the log message for a class indicating an issue the log message addresses;

determining an alert type for the log message based on the sentiment value, the class, and a priority of the log message, wherein the alert type is preconfigured with a set of alert type values of varying risk levels; and producing a system alert to a user according to the alert type for the log message, wherein the system alert comprises a predefined set of key performance indicators corresponding to the alert type to thereby inform the user on the issue addressed by the log message.

9. The computer program product of claim 8, further comprising:

processing the log message, prior to the assigning, by separating text of the log message as resulting from removing special characters of the log message and extracting parameters and values of the log messages as respective data entities;

allocating an identifier for a unique text of the log message; and storing the unique text of the log message in a distinct message table if the unique text of the log message is not already present.

10. The computer program product of claim 8, the assigning comprising:

determining respective sentiment scores of the words appearing in the log message by use of a sentiment lexicon available in natural language processing as being applied to the log data specific lexicon;

weighing the respective sentiment scores of the words in the log message based on a meaning of each of the words in log message contexts; and determining a sum of all of the weighted sentiment scores respective to each of the words in the log message as the sentiment value to the log message.

11. The computer program product of claim 8, further comprising:

determining, subsequent to the determining the alert type, a set of key performance indicators corresponding to the alert type, wherein the set of alert type values comprises Real time, wherein if the alert type is Real time then the log message is immediately alerted to the user with the key performance indicators comprising a timestamp, a text-only message, the class, an identifier of a distinct message, the sentiment value, and the priority of the log message.

12. The computer program product of claim 8, further comprising:

determining, subsequent to the determining the alert type, a set of key performance indicators corresponding to the alert type, wherein the set of alert type values comprises Static time window and Dynamic time window, wherein if the alert type is Static time window then the log message is alerted only when the log message is repeated more times than a threshold count of the log message within a predefined static time window, and wherein the log message is alerted to the user with the key performance indicators comprising an arrival time of the log message, a time window for the log message to be repeated, the sentiment, the priority, a text-only message as identified by a distinct message, the sentiment value, and the priority of the log message, a count of the log message indicating how many times the log message has been repeated within the time window, and an alert filter indicating whether or not the count of the log message is greater than a threshold count to qualify as the alert.

13. The computer program product of claim 8, the classifying comprising:

performing a part-of-speech analysis on the log message by use of natural language processing tools;

collecting nouns of the log message resulting from the part-of-speech analysis and forming noun phrases in the log message with any immediately consecutive nouns in the log message; and determining a noun phrase with the greatest number of characters as the class of the log message.

14. The computer program product of claim 8, further comprising:

obtaining a user feedback commenting on a reduced accuracy of the weighted sentiment score for a group of words in the log data specific lexicon; and reassessing the weighted sentiment score with the binary polarity for each word in the group of words in the log data specific lexicon based on a new log data samples.

15. A system comprising:
a memory;
one or more processors in communication with the memory; and
program instructions executable by the one or more processors via the memory to perform a method comprising:

creating a log data specific lexicon based on log data samples, each word in the log data specific lexicon corresponding to a weighted sentiment score with a binary polarity;

obtaining a log message from a computing platform;

assigning a sentiment value to the log message based on respective weighted sentiment scores by the log data specific lexicon corresponding to words appearing in the log message;

classifying the log message for a class indicating an issue the log message addresses;

determining an alert type for the log message based on the sentiment value, the class, and a priority of the log message, wherein the alert type is preconfigured with a set of alert type values of varying risk levels; and producing a system alert to a user according to the alert type for the log message, wherein the system alert comprises a predefined set of key performance indicators corresponding to the alert type to thereby inform the user on the issue addressed by the log message.

16. The system of claim 15, further comprising:

processing the log message, prior to the assigning, by separating text of the log message as resulting from removing special characters of the log message and extracting parameters and values of the log messages as respective data entities;

allocating an identifier for a unique text of the log message; and storing the unique text of the log message in a distinct message table if the unique text of the log message is not already present.

17. The system of claim 15, the assigning comprising:

determining respective sentiment scores of the words appearing in the log message by use of a sentiment lexicon available in natural language processing as being applied to the log data specific lexicon;

weighing the respective sentiment scores of the words in the log message based on a meaning of each of the words in log message contexts; and determining a sum of all of the weighted sentiment scores respective to each of the words in the log message as the sentiment value to the log message.

18. The system of claim 15, further comprising:

determining, subsequent to the determining the alert type, a set of key performance indicators corresponding to the alert type, wherein the set of alert type values comprises Real time, wherein if the alert type is Real time then the log message is immediately alerted to the user with the key performance indicators comprising a timestamp, a text-only message, the class, an identifier of a distinct message, the sentiment value, and the priority of the log message.

19. The system of claim 15, further comprising:

determining, subsequent to the determining the alert type, a set of key performance indicators corresponding to the alert type, wherein the set of alert type values comprises Static time window and Dynamic time window, wherein if the alert type is Static time window then the log message is alerted only when the log message is repeated more times than a threshold count of the log message within a predefined static time window, and wherein the log message is alerted to the user with the key performance indicators comprising an arrival time of the log message, a time window for the log message to be repeated, the sentiment, the priority, a text-only message as identified by a distinct message, the sentiment value, and the priority of the log message, a count of the log message indicating how many times the log message has been repeated within the time window, and an alert filter indicating whether or not the count of the log message is greater than a threshold count to qualify as the alert.

20. The system of claim 15, further comprising:
obtaining a user feedback commenting on a reduced accuracy of the weighted sentiment score for a group of words in the log data specific lexicon; and
reassessing the weighted sentiment score with the binary polarity for each word in the group of words in the log data specific lexicon based on a new log data samples.

* * * * *